(12) United States Patent
Varsell et al.

(10) Patent No.: US 7,291,800 B2
(45) Date of Patent: Nov. 6, 2007

(54) EDM ELECTRODE TOOL HOLDER

(75) Inventors: Richard Varsell, Bristol, CT (US); James M. Koonankeil, Marlborough, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 11/360,234

(22) Filed: Feb. 23, 2006

(65) Prior Publication Data

US 2007/0193979 A1    Aug. 23, 2007

(51) Int. Cl.
  *B23H 7/26* (2006.01)
(52) U.S. Cl. .................................. 219/69.15
(58) Field of Classification Search ............ 219/69.15, 219/138, 86.25; 204/224 M, 297.01
  See application file for complete search history.

(56) References Cited

U.S. PATENT DOCUMENTS

| | | | | |
|---|---|---|---|---|
| 3,125,700 A | * | 3/1964 | Bentley et al. | 219/69.16 |
| 4,633,053 A | * | 12/1986 | Puthran | 219/69.15 |
| 4,713,515 A | * | 12/1987 | Choi | 219/69.15 |
| 6,791,054 B1 | * | 9/2004 | Mertz | 219/69.15 |

FOREIGN PATENT DOCUMENTS

JP    2002-52422 A   *   2/2002

\* cited by examiner

*Primary Examiner*—Geoffrey S. Evans
(74) *Attorney, Agent, or Firm*—Carlson, Gaskey & Olds

(57) ABSTRACT

An electrical discharge machining assembly has a fixture that retains an electrode. The fixture has clamps to apply a clamping force to the electrode. A threaded member adjusts the compression of a spring to change the clamping force for each clamp. For each clamp, the spring applies a force to a clamp lever pivotably attached to the fixture. Pivoting of the clamp lever moves a lower portion of each clamp lever closer to the fixture clamping the electrode to the fixture body. A clamp release is located proximate to the fixture to rotate the clamp levers in an opposite direction releasing the clamping pressure and the electrode.

20 Claims, 5 Drawing Sheets

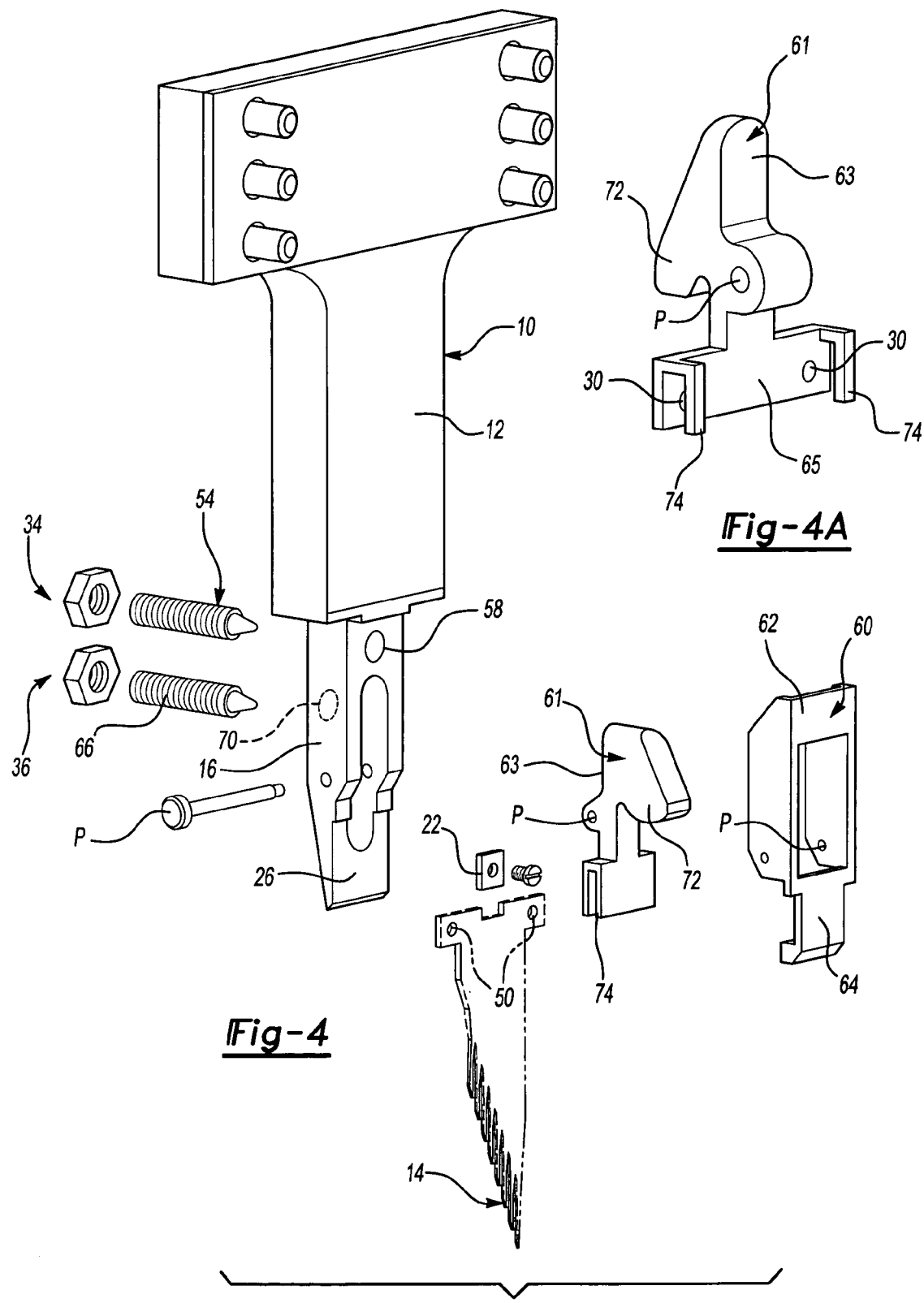

EDM ELECTRODE TOOL HOLDER

BACKGROUND OF THE INVENTION

This invention is an improved electrical discharge-machining fixture that retains the electrode while minimizing variations in the position of an electrode within the fixture.

Electrical discharge machining (EDM) is a highly accurate method of drilling or machining metals. An electrode is attached to an EDM fixture for drilling or machining the metals. Because of the high accuracy, EDM is commonly used to drill airfoil cooling holes in the surface of turbine blades. In order to achieve accurate drilling the retaining fixture for the electrode must have a high degree of repeatability with minimal position variations for the electrode.

When using EDM to drill holes within turbine blades a stamped electrode comb is typically used. The comb has a relatively thin cross-section when compared to the width of the comb. The shape of the comb makes reliably positioning the electrode and retaining the electrode within the EDM fixture difficult. It is also desirable to be able to control the clamping force placed on the electrode by the retaining feature.

When using the currently known retention method a clamp retains and positions the electrode during the EDM operation by applying force to the electrode. External forces such as dielectric fluid flushing and movement of the machining axes during the EDM operation cause the electrode to release or move within the clamp.

An improved fixture for retaining an electrode that has minimal positional variations for the electrode and an adjustable retaining force that allows automated insertion and injection of the electrode for use in electrical discharge machining is needed.

SUMMARY OF THE INVENTION

An electrical discharge-machining fixture retains an electrode while minimizing variations in the position of the electrode, and has an adjustable retaining force.

An electrical discharge machining assembly has a fixture that retains an electrode. The fixture has a plurality of body features and the electrode has a plurality of electrode features to correspondingly align with the body features to properly position the electrode in all directions of movement.

The fixture has a first and a second actuator to apply a clamping force to retain the electrode after the electrode has been correctly aligned with the fixture. The first and second actuators both include a threaded member, for example a bolt, and a spring. The clamping pressure applied to the electrode by each actuator can be adjusted by turning the associated bolt to adjust the compression of the spring. For each actuator the spring applies a force to an associated clamp lever to pivot an upper portion of each clamp lever away from the fixture. The pivoting motion of the clamp lever moves a lower portion of the clamp lever closer to the fixture. The electrode is positioned between the fixture and the clamp levers. Thus, the levers clamp the electrode to the fixture body as a result of the force applied by the spring.

A clamp release is located proximate to the clamp levers for both clamps. When upward force is applied to the clamp release the upper portion of the clamp levers are forced toward the body. A lower portion of each clamp lever is moved away from the fixture body, releasing the clamping pressure and the electrode. The clamp release is biased downward to maintain the clamp levers in the clamping position These and other features of the present invention can be best understood from the following specification and drawings, the following of which is a brief description.

BRIEF DESCRIPTION OF THE DRAWINGS

FIG. 4 is an exploded view of an embodiment of fixture clamps of the present invention.

FIG. 4a is another view of the clamp release of the present invention;

DETAILED DESCRIPTION OF THE PREFERRED EMBODIMENT

Figure 1:
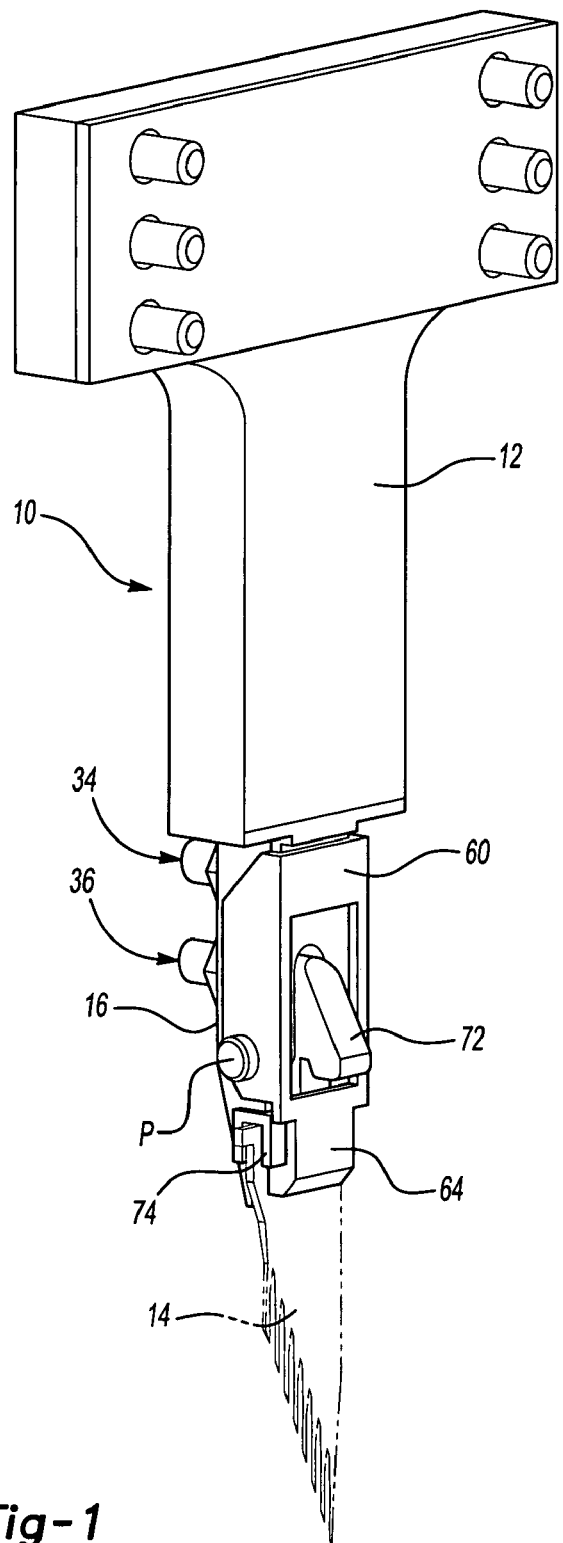
FIG. 1 is an embodiment of an electrical discharge machining assembly of the present invention.

FIG. 1 shows an illustration of the present invention of an electrical discharge machining assembly 10 for use in electrical discharge machining (EDM). The assembly 10 has a fixture 12 that retains an electrode 14. The fixture 12 includes a fixture body 16. The electrode 14 is aligned with the fixture body 16 to obtain a correct position of the electrode 14. After the electrode 14 has been correctly positioned, a clamping force is applied to retain the electrode 14 within the fixture 12.

Figure 2:
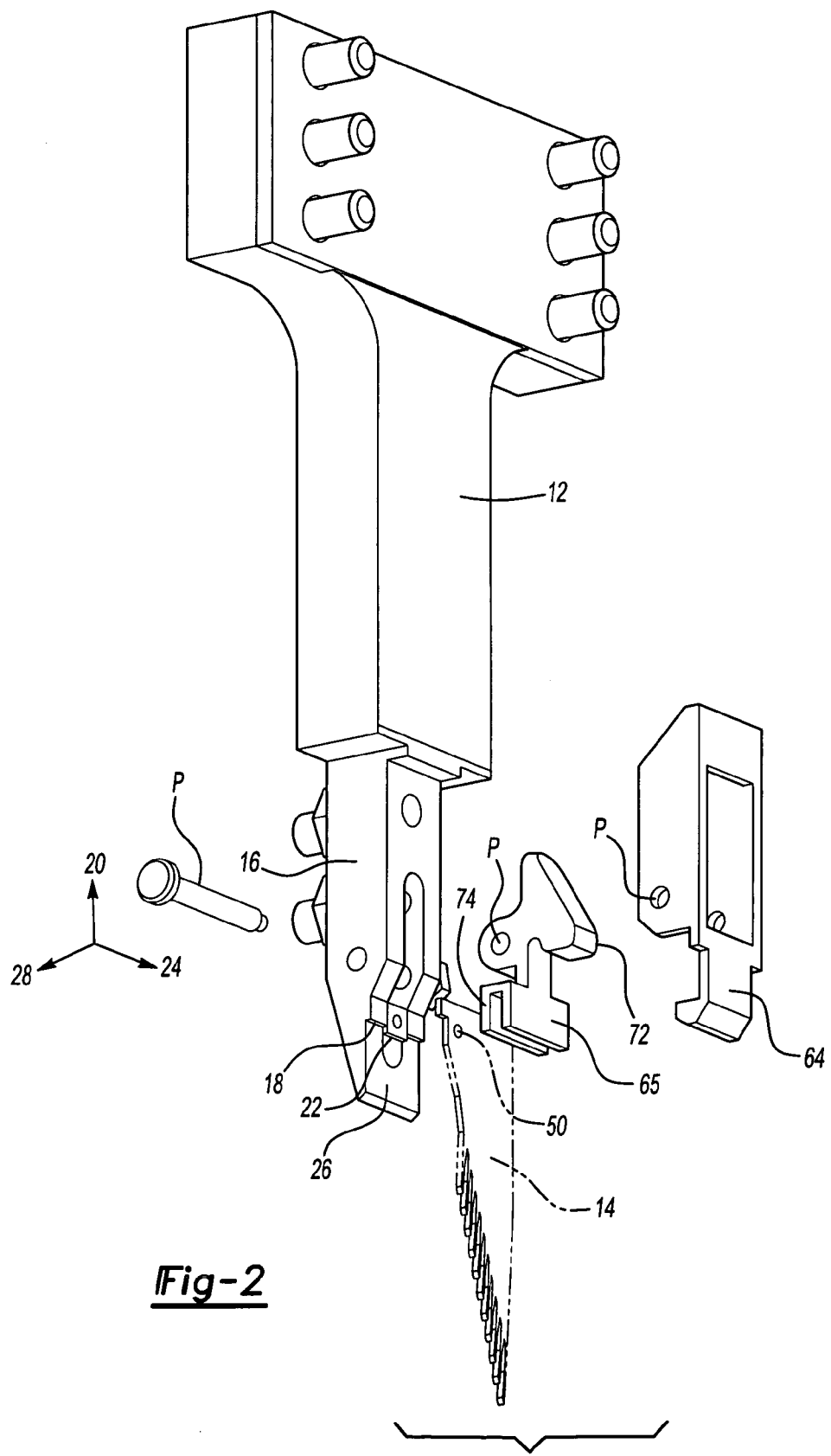
FIG. 2 is an embodiment of a fixture of the present invention.

FIG. 2 is an illustration of the fixture 12. The fixture body 16 has a first body feature 18. The first body feature 18 is used to align the electrode 14 (shown in FIG. 1) in the proper position with respect to a first direction of movement 20. A second body feature 22 is also located on the fixture body 16 to align the electrode 14 in the proper position with respect to a second direction of movement 28. The second direction of movement 28 is preferably perpendicular to the first direction of movement 20. A third body feature 26 is located on the fixture body to align the electrode 14 in the proper position with respect to a third direction of movement 24. The third direction of movement 24 is preferably perpendicular to both the first direction of movement 20 and the second direction of movement 24. In the embodiment shown the first body feature 18, the second body feature 22 and the third body feature 26 are preferably surfaces on the fixture body 16.

The fixture body 16 may additionally have a plurality of body locators 30 (shown in FIG. 4a). In the embodiment shown the body locators 30 are a pair of tooling balls. Other features that create a surface that is offset from the fixture body 16 may also be used as body locators 30. Although a pair of body locators are used, other numbers may be used. When the electrode 14 is clamped within the fixture 12 the body locators 30 apply a force to the electrode 14 pushing the electrode 14 upward in the fixture 12.

Figure 3:
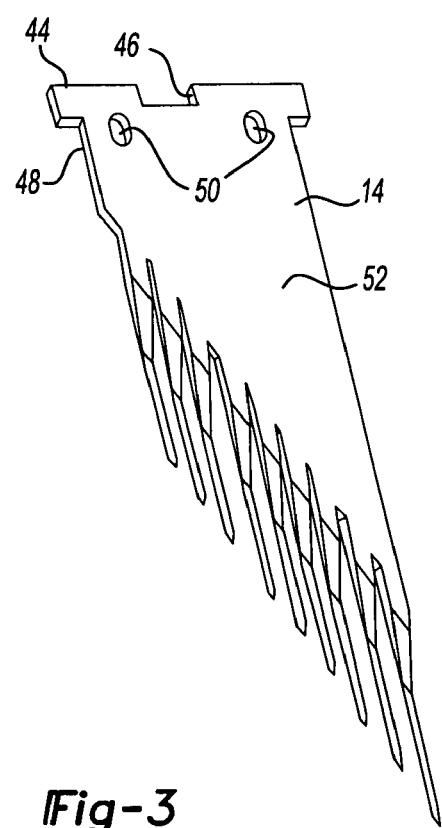
FIG. 3 is an embodiment of an electrode of the present invention.

FIG. 3 is an illustration of the electrode 14. The electrode 14 has a first electrode feature 44. The first electrode feature 44 is used to align the electrode 14 with the fixture body 16 in the proper position with respect to the first direction of movement 20. A second electrode feature 46 is used to align the electrode 14 with the fixture body 16 in the proper position with respect to the second direction of movement 24. A third electrode feature 48 is used to align the electrode 14 with the fixture body 16 in the proper position with respect to the third direction of movement 28. In the embodiment shown the first electrode feature 44, the second electrode feature 46 and the third electrode feature 48 are surfaces on the electrode 14.

The electrode 14 may additionally have a plurality of electrode locators 50 which are offset from a surface 52 of the electrode 14. In the embodiment shown, the electrode locators 50 are a pair of holes in the electrode 14. Other features that create an offset surface from the surface 52 may also be used. The number of electrode locators 50 should correspond to the number of body locators 30 on the fixture body 16.

Referring to FIGS. 1, 2 and 3, the first electrode feature 44 is aligned with and contacts the first body feature 18, the second electrode feature 46 is aligned with and contacts the second body feature 22, and the third electrode feature 48 is aligned with and contacts the third body feature 26. Aligning the electrode 14 with the fixture body 16 for each of the corresponding features correctly positions the electrode 14 to the fixture body 16 in all directions of movement. The body locators 30 correspond to the electrode locators 50. Thus, the body locators 30, in this embodiment tooling balls, on the fixture 12 fit with the electrode locators 50, in this embodiment holes, on the electrode 14. A first actuator 36 and a second actuator 34 apply a clamping force to the electrode 14 to retain the electrode 14 in the correct position within the fixture 12.

FIG. 4 is an exploded view showing a second actuator 34 and a first actuator 36. In the embodiment shown, the second actuator 34 and the first actuator 36 are a pair of spring plungers. The spring plungers allow for variation in the clamping force applied to the electrode 14. Alternate methods of applying a clamping force to the electrode 14 such as pneumatic, hydraulic or other mechanical means of actuation may also be used.

The first actuator 36 has a first threaded member 66 and a first spring 68. The first threaded member 66 fits within a first opening 70. The first threaded member 66 may be rotated to within the first opening 70 to adjust the compression of the first spring 68. Adjusting the compression of the first spring 68 changes the clamping force of the first actuator 36.

The first spring 68 also applies a force to a first clamp lever 61. The first spring 68 pushes an upper portion 63 of the first clamp lever 61 away from the fixture body 16. As a result, the first clamp lever 61 pivots about the point P. The pivoting motion of the a first clamp lever 61 moves the lower portion 65 of the a first clamp lever 61 closer to the fixture body 16 pushing the body locators 30 closer to the fixture body 16. FIG. 4a shows the first clamp lever 61 rotated such that the body locators 30 can be seen. The first clamp lever 61 clamps the body locators 30 to the electrode locators 50 as a result of the force applied by the first spring 68. The center of the body locators 30 are offset upward within the fixture 12 from the center of the electrode locators 50. The upward offset results in pushing the electrode 14 up within the fixture 12.

Figure 5:
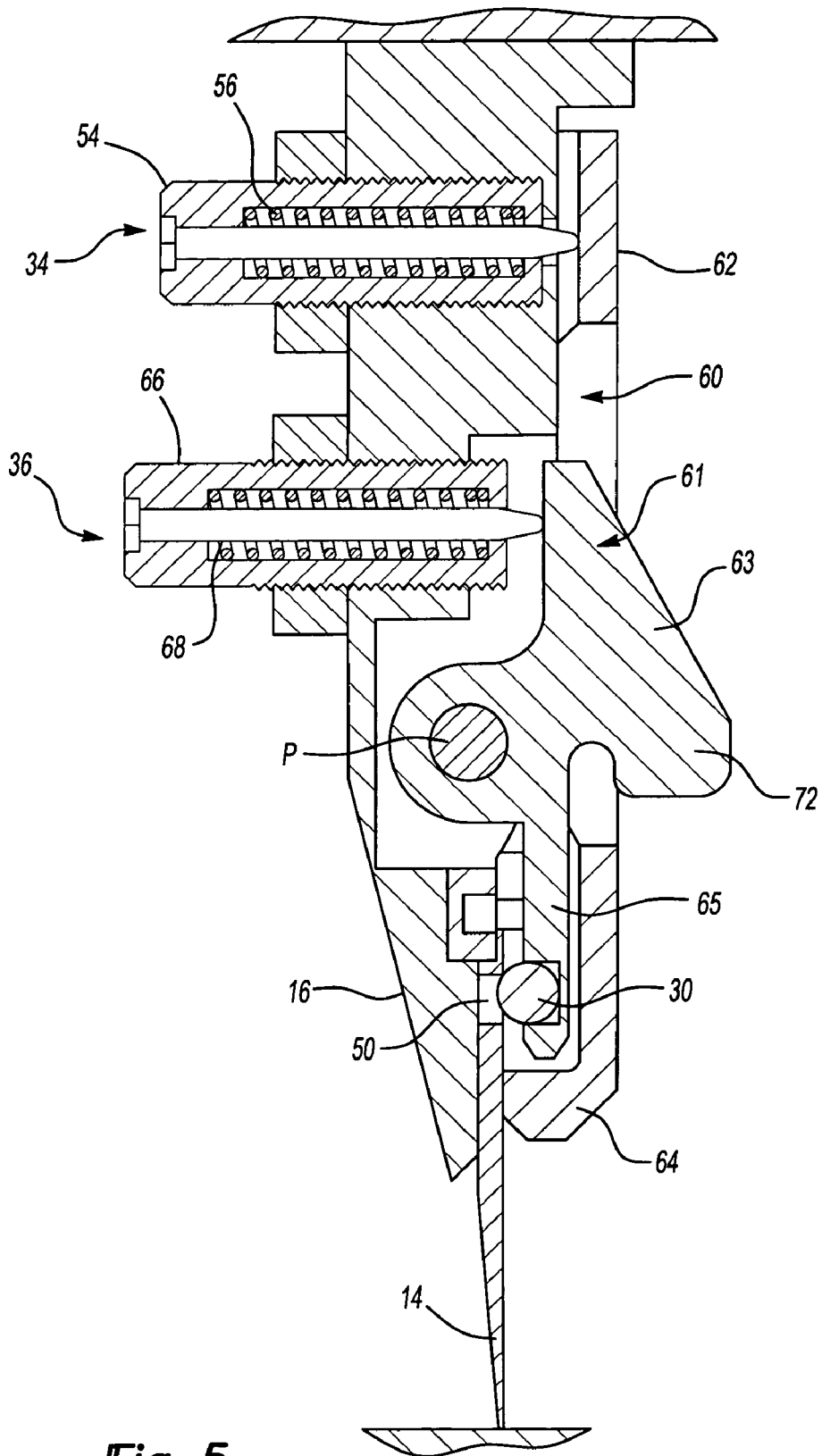
FIG. 5 is a cross-section through the fixture showing a clamp release of the present invention in a clamped position.

Likewise, the second actuator 34 has a second threaded member 54 and a second spring 56 (shown in FIG. 5). The second threaded member 54 fits within a second opening 58. The second threaded member 54 may be rotated to move axially within the second opening 58 to adjust the compression of the second spring 56. Adjusting the compression of the second spring 56 changes the clamping force of the second actuator 34.

The second spring 56 applies a force to a second clamp lever 60. The second clamp lever 60 is pivotably attached to the fixture body 16 at a pivot point P. The second spring 56 pushes an upper portion 62 of the second clamp lever 60 away from the fixture body 16. As a result, the second clamp lever 60 pivots about point P. FIG. 5 shows the second clamp lever 60 pivoted away from the fixture body 16. The pivoting motion of the second clamp lever 60 moves a lower portion 64 of the second clamp lever 60 closer to the fixture body 16. The electrode 14 is positioned between the fixture body 16 and the second clamp lever 60 when the electrode 14 is aligned with the fixture body 16. Thus, the second clamp lever 60 clamps the electrode 14 to the fixture body 16 as a result of the force applied by the second spring 56.

As shown in FIG. 4, the second actuator 34 and the first actuator 36 rotate about the common pivot point P relative to the fixture 12. The second actuator 34 and the first actuator 36 may be offset to rotate about separate points as well.

Figure 6:
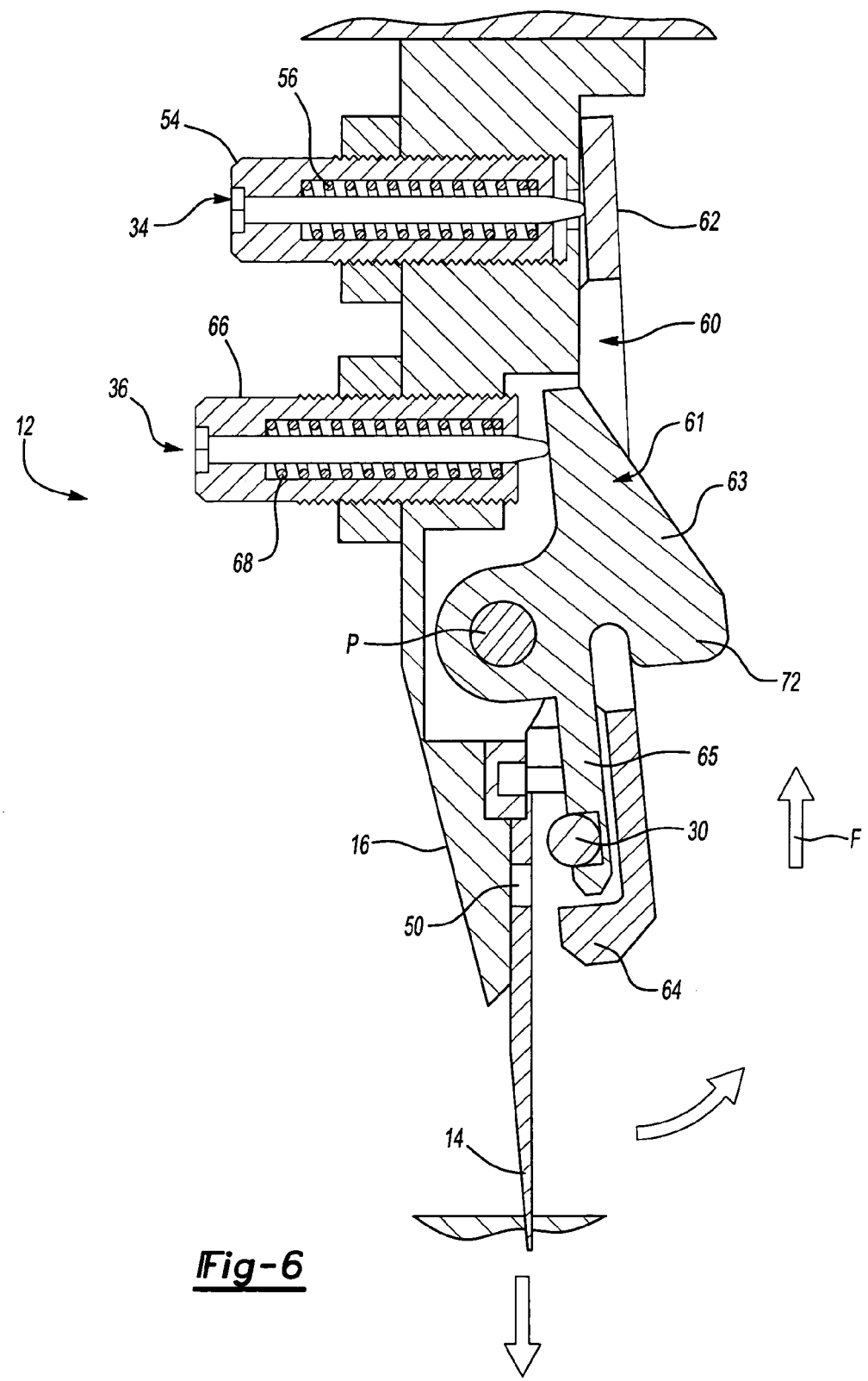
FIG. 6 is a cross-section through the fixture showing a clamp release of the present invention in a released position.

FIGS. 5 and 6 show a clamp release 72 rotatably connected to the fixture body 16 at the pivot P. The clamp release 72 is rotated way from the fixture body by the first actuator 36. As in FIG. 6, upward force (illustrated by arrow F) is applied to the clamp release 72, rotating the upper portion 63 of the first clamp lever 61 toward the fixture body 16. The first clamp lever 61 pivots about the pivot point P and the lower portion 65 moves away from the fixture body 16. As the lower portion 65 moves away from the fixture body 16 pressure is applied to the lower portion 64 of the second clamp lever 60, moving the lower portion 64 away from the fixture body 16 as well. Thus, the pivoting of the second clamp lever 60 and first clamp lever 61 release the clamping pressure and the electrode 14.

When the clamping pressure is released, the upward force applied by the body locators 30 is removed and the electrode 14 will fall from the fixture 12 as a result of gravity. Dislodging features 74 apply pressure on the electrode 14 as the clamp release 72 is rotated. The pressure from the dislodging features 74 prevents the electrode 14 from sticking within the fixture 12. In the embodiment shown the dislodging features 74 have a U-shape and a portion of the electrode 14 fits within the U-shape when the electrode is assembled within the fixture 12, as shown in FIG. 1.

The clamp release 72 is biased outward from the fixture body 16 to maintain the second clamp lever 60 and the first clamp lever 61 in the clamping position. The assembly 10 can automatically move the clamp release 72 to the release position to remove the electrode and position a new electrode between each EDM cycle. Thus, replacement of the electrode within the assembly 10 may be fully automated.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An electrode tool fixture comprising:
 a first actuator for retaining an electrode within said fixture;
 a second actuator for retaining said electrode within said fixture; and
 an electrode aligned with a fixture body and retained by said first actuator and said second actuator, each of said first and second actuators being biased to a position holding said electrode within said fixture body.

2. The fixture of claim 1, wherein said bias force is provided by a spring.

3. The fixture of claim 2, wherein a separate spring is provided for each of said first and second actuators.

4. The fixture of claim 1 wherein a first threaded member is located within the fixture body to adjust a compression force on said first spring and a second threaded member is located within the fixture body to adjust a compression force on said second spring.

5. The fixture of claim 4, wherein said first actuator includes a first clamp lever pivotably attached to said fixture body and said second actuator includes a second clamp lever pivotably attached to said fixture body.

6. The fixture of claim 5, wherein said first clamp lever and said second clamp lever pivot in a first direction to apply a clamping force to said electrode and pivot in an opposite direction to release said clamping force.

7. An electrode tool fixture comprising;
a first actuator for retaining an electrode within said fixture;
a second actuator for retaining said electrode within said fixture;
an electrode aligned with a fixture body and retained by said first actuator and said second actuator; and
said first actuator includes a first clamp lever pivotably attached to said fixture body and said second actuator includes a second clamp lever pivotably attached to said fixture body.

8. The fixture of claim 7, wherein said first clamp lever and said second clamp lever pivot in a first direction to apply a clamping force to said electrode and pivot in an opposite direction to release said clamping force.

9. An electrode tool fixture comprising:
a first actuator for retaining and electrode within said fixture;
a second actuator for retaining said electrode within said fixture;
an electrode aligned with a fixture body and retained by said first actuator and said second actuator, wherein said fixture body includes a plurality of body locators offset from a surface of said fixture body corresponding to a plurality of electrode locators offset from a surface of said electrode, wherein a center of each of said plurality of body locators is offset from a center of each of said plurality of electrode locators.

10. The fixture of claim 9, wherein said plurality of body locators are a pair of tooling balls corresponding to said electrode locators which are a pair of holes in said electrode.

11. An electrode tool fixture comprising:
a fixture body;
a first actuator for pivoting a first clamp lever attached to said fixture body to retain an electrode within said fixture; and
a second actuator for pivoting a second clamp lever attached to said fixture body to retain the electrode within said fixture, said first and second clamp levers being biased for contracting and holding an electrode within said fixture body.

12. The fixture of claim 11, wherein said first actuator has a first spring and said second actuator has a second spring.

13. The fixture of claim 12, wherein a first threaded member is located within said fixture body to adjust a compression force on said first spring and a second threaded member is located within said fixture body to adjust a compression force on said second spring.

14. The fixture of claim 11, wherein said first clamp lever and said second clamp lever pivot in a first direction to apply a clamping force to said electrode and pivot in an opposite direction to release said clamping force.

15. The fixture of claim 11, wherein a clamp release is located proximate said first clamp lever and said second clamp lever to allow release of said first actuator and said second actuator.

16. A method retaining an electrode within an electrode fixture comprising:
a) locating an electrode with a fixture body;
b) clamping the electrode to the fixture body with a first actuator;
c) clamping the electrode to the fixture body with a second actuator; and
d) said step b) and said step c) include rotating a clamp lever about a pivot point to apply a clamping force to the electrode.

17. The method of claim 16, further comprising
d) moving a clamp release to release both the first actuator and the second actuator.

18. The method of claim 16, wherein said step b) and said step c) include adjusting a clamping force on said electrode.

19. The method of claim 18, wherein turning a threaded member adjusts the clamping force.

20. An electrode tool fixture comprising:
a first actuator for retaining an electrode within said fixture;
a second actuator for retaining said electrode within said fixture;
an electrode aligned with a fixture body and retained by said first actuator and said second actuator; and
a clamp release located proximate said fixture body to release said first actuator and said second actuator.

* * * * *

UNITED STATES PATENT AND TRADEMARK OFFICE
CERTIFICATE OF CORRECTION

PATENT NO. : 7,291,800 B2
APPLICATION NO. : 11/360234
DATED : November 6, 2007
INVENTOR(S) : Varsell et al.

It is certified that error appears in the above-identified patent and that said Letters Patent is hereby corrected as shown below:

Claim 9, Column 5, line 36: "and" should read as --an--

Claim 9, Column 5, line 42: "locators" should read as --locaters--

Claim 9, Column 5, line 44: "locators" should read as --locaters--

Claim 9, Column 5, line 45: "locators" should read as --locaters--

Claim 9, Column 5, line 47: "locators" should read as --locaters--

Claim 10, Column 5, line 49: "locators" should read as --locaters--

Claim 10, Column 5, line 50: "locators" should read as --locaters--

Signed and Sealed this

Eighteenth Day of March, 2008

JON W. DUDAS
*Director of the United States Patent and Trademark Office*